United States Patent
Amparan et al.

(10) Patent No.: US 7,058,265 B2
(45) Date of Patent: Jun. 6, 2006

(54) CUSTOMIZING TRAVELING WAVE OPTICAL MODULATORS

(75) Inventors: Alfonso Benjamin Amparan, Fort Collins, CO (US); David Lee Gines, Fort Collins, CO (US)

(73) Assignee: Avago Technologies, Ltd., Singapore (SG)

( * ) Notice: Subject to any disclaimer, the term of this patent is extended or adjusted under 35 U.S.C. 154(b) by 244 days.

(21) Appl. No.: 10/446,037

(22) Filed: May 27, 2003

(65) Prior Publication Data
US 2004/0240789 A1 Dec. 2, 2004

(51) Int. Cl.
*G02B 6/42* (2006.01)
(52) U.S. Cl. .............................. 385/40; 385/8
(58) Field of Classification Search ........... 385/1–10, 385/40; 359/237, 245
See application file for complete search history.

(56) References Cited

U.S. PATENT DOCUMENTS

| 5,347,601 A | * | 9/1994 | Ade et al. ................... 385/3 |
| 5,548,668 A | | 8/1996 | Schaffner |
| 6,051,907 A | * | 4/2000 | Ylilammi .................. 310/312 |
| 6,198,855 B1 | | 3/2001 | Hallemeier et al. |
| 6,301,399 B1 | * | 10/2001 | Mahapatra et al. ........... 385/2 |
| 6,392,781 B1 | | 5/2002 | Kim et al. |
| 6,522,793 B1 | * | 2/2003 | Szilagyi et al. ............... 385/2 |
| 6,545,791 B1 | | 4/2003 | McCaughan et al. |
| 6,839,489 B1 | * | 1/2005 | Switzer et al. ............... 385/40 |

* cited by examiner

*Primary Examiner*—Sung Pak

(57) ABSTRACT

In a method of fabricating a traveling wave optical modulator, an optical waveguide structure having an optical waveguide and a signal electrode path extending from a signal input to a termination output is formed. The signal electrode path is modified to include a customized signal electrode having a transmission line characteristic substantially matching a target transmission line parameter value. In another aspect, a traveling wave optical waveguide structure includes an optical waveguide and a signal electrode path. The signal electrode path extends from a signal input to a termination output and is defined by an electrode seed structure. The electrode seed structure is exposed for subsequent electrode formation and has a transmission line characteristic detrimental to proper propagation of an electrical modulation signal.

20 Claims, 2 Drawing Sheets

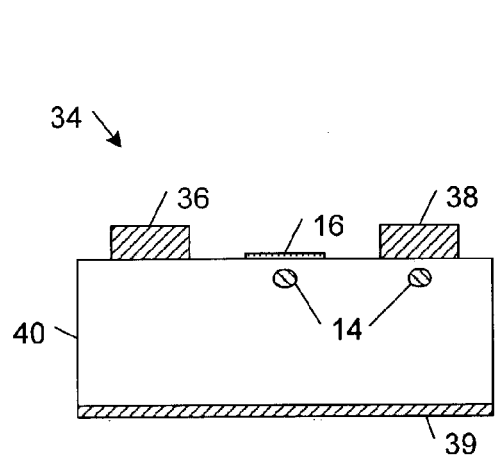
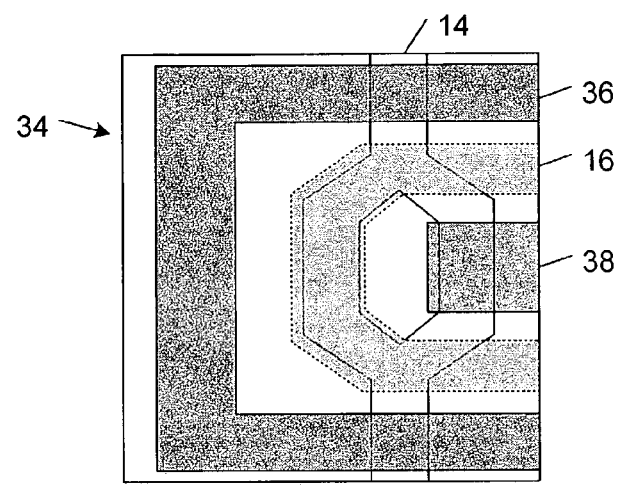
FIG. 4A  FIG. 4B
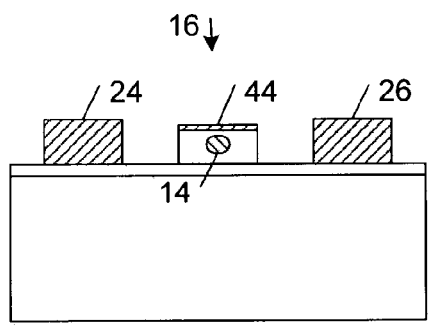
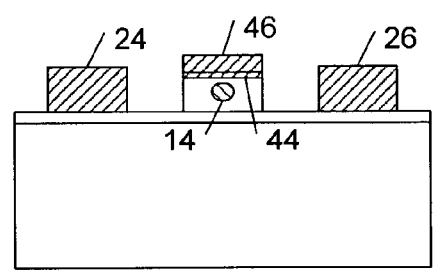
FIG. 5A  FIG. 5B
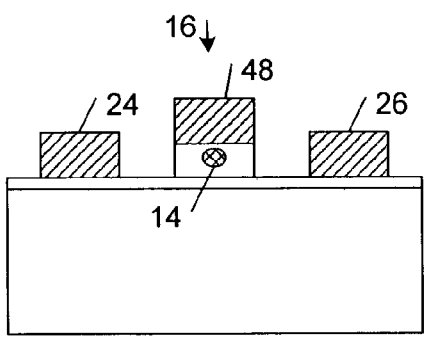
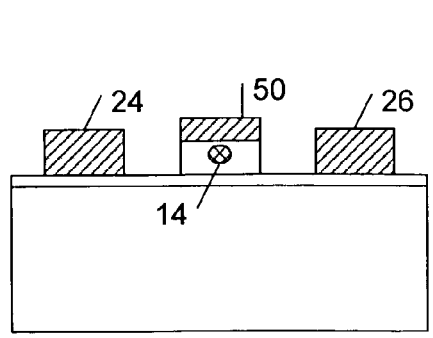
FIG. 6A  FIG. 6B

CUSTOMIZING TRAVELING WAVE OPTICAL MODULATORS

BACKGROUND

Two general approaches typically are used to intensity-modulate light: direct modulation and external modulation.

In a direct modulation approach, a laser (e.g., a laser diode) is directly modulated by an information signal to generate a modulated laser output. The laser output power often is modulated directly by modulating the input drive current to the laser. The laser begins lasing when the drive current exceeds a threshold current level. Typically, the modulation range of input drive current that is applied to a directly modulated laser extends above and below the threshold current level.

In an external modulation approach, a modulator modulates the intensity of light generated by a continuous wave laser in accordance with an information signal. The modulator and laser may be disposed on separate, discrete substrates or they may be fabricated together on a single substrate. External modulators fall into two main families: electro-optic type modulators, such as Mach-Zehnder type electro-optic modulators, which modulate light through destructive interference; and electro-absorption modulators, which modulate light by absorption (e.g., through Quantum Confined Stark effects). The absorption spectrum of an electro-absorption modulator depends on the drive voltage across the modulator. For example, some modulators are transparent with no drive voltage and are opaque with an applied voltage. Thus, with these types of modulators, a continuous wave laser may be modulated to generate a digital bit stream by varying the drive voltage across the modulator.

In an optical modulator, a time-varying electric signal modulates the input optical signal. Lump-type optical modulators typically are limited at high frequencies by their total capacitance. Typical high-speed external optical modulators avoid such a limitation by using a traveling-wave electrode structure, which includes a transmission line signal electrode located near an optical waveguide carrying the input optical signal. In a traveling wave optical modulator, the optical modulation is dominated by the distributed interaction between the time-varying input electrical signal and an optical signal over the length of the optical modulator. Ideally, the input electrical signal and the input optical signal propagate with substantially the same phase velocities through a traveling wave optical modulator so that each portion of the optical signal interacts with substantially the same portion of the applied electrical signal as it propagates through the modulator.

In addition to matching optical and electrical phase velocities, it is desirable to reduce electrical losses as the input electrical signal travels through a traveling wave optical modulator. It also is desirable to match the characteristic impedance of the optical modulator to the impedance of the source of the input electrical signal to reduce reflections and increase the electrical power delivered to the optical modulator. The geometry of the input signal electrode may be tailored to match optical and electrical phase velocities, to match the characteristic impedance of the modulator to the source impedance, or to reduce electrical losses along the signal electrode. Typical electrode geometry parameters that are varied to achieve the desired electrical parameters include the thickness of the electrode, the width of the electrode, and the spacing between the top electrode and the side ground electrode (if present).

SUMMARY

The invention features a method of customizing a traveling wave optical modulator and an optical waveguide structure. The invention allows an optical waveguide structure that has a design optimized for optical propagation to be subsequently customized to have one or more transmission line characteristics optimized over a range of different target transmission line parameter values. The invention therefore enables a manufacturer to pre-fabricate a plurality of such optical waveguide structures and to subsequently modify the optical waveguide structures to form customized traveling wave optical modulators for customers requiring different transmission line characteristics.

In one aspect, the invention features a method of fabricating a traveling wave optical modulator. In accordance with this inventive method, an optical waveguide structure having an optical waveguide and a signal electrode path extending from a signal input to a termination output is formed. The signal electrode path is modified to include a customized signal electrode having a transmission line characteristic substantially matching a target transmission line parameter value.

In another aspect, the invention features a traveling wave optical waveguide structure that includes an optical waveguide and a signal electrode path. The signal electrode path extends from a signal input to a termination output and is defined by an electrode seed structure. The electrode seed structure is exposed for subsequent electrode formation and has a transmission line characteristic detrimental to proper propagation of an electrical modulation signal.

Other features and advantages of the invention will become apparent from the following description, including the drawings and the claims.

DESCRIPTION OF DRAWINGS

FIGS. 4A and 4B are, respectively, diagrammatic side and top views of an electro-optic-type implementation of the optical waveguide structure of FIG. 2.

FIG. 5A is a diagrammatic side view of the optical waveguide structure of FIG. 2 in which the signal electrode path is defined by an electrode seed structure.

FIG. 5B is a diagrammatic side view of a traveling wave optical modulator that has been customized by forming a customized signal electrode on the electrode seed structure of FIG. 5A.

FIG. 6A is a diagrammatic side view of the optical waveguide structure of FIG. 2 in which the signal electrode path is defined by an uncustomized signal electrode structure.

FIG. 6B is a diagrammatic side view of a traveling wave optical modulator that has been customized by reducing the thickness of the signal electrode structure of FIG. 6A.

DETAILED DESCRIPTION

Figure 1:
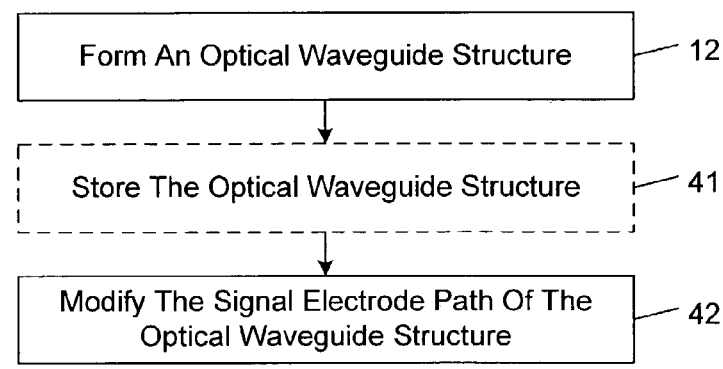
FIG. 1 is a flow diagram of a method of customizing a traveling wave optical modulator.
Figure 2:
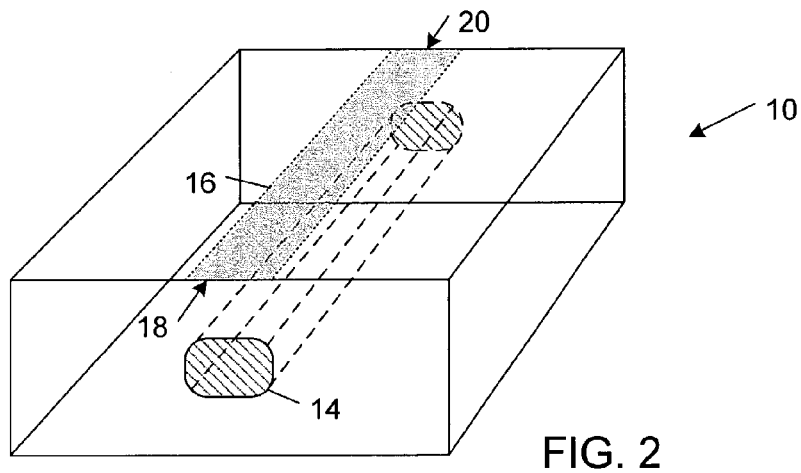
FIG. 2 is a diagrammatic view of an optical waveguide structure.

In the following description, like reference numbers are used to identify like elements. Furthermore, the drawings are intended to illustrate major features of exemplary embodi- Referring to FIGS. 1 and 2, in some embodiments, a traveling wave optical modulator is customized as follows. An optical waveguide structure 10 is formed (step 12). The optical waveguide structure 10 includes an optical waveguide 14 and a signal electrode path 16 that extends from a signal input 18 to a termination output 20. The optical waveguide 14 may be any structure capable of guiding an optical signal along a length of the optical waveguide structure 10. Signal electrode path 16 may include any surface treatment or structure that may be subsequently modified (e.g., by addition or reduction of material) to include a customized signal electrode having a transmission line characteristic substantially matching a respective target transmission line parameter value.

The optical waveguide structure 10 may be implemented in the form of any waveguide structure that is suitable for any type of traveling wave optical modulator, including an electro-absorption-type optical modulator, an electro-optic-type optical modulator (e.g., a Mach-Zehnder type of optical modulator), a directional coupler, an X coupler, an acousto-optic-type optical modulator (e.g., a diffraction modulator), and a mode transformer (e.g., a digital optical switch).

Figure 3:
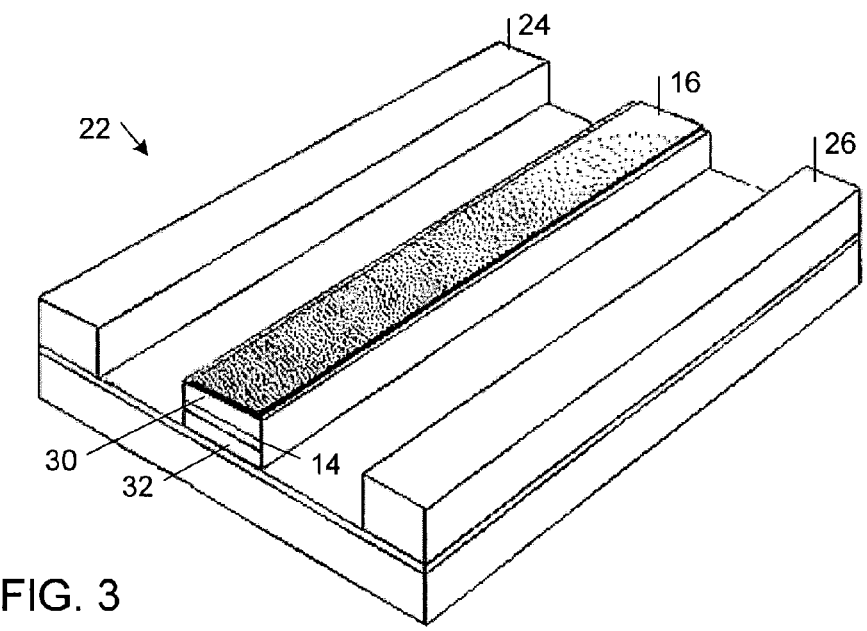
FIG. 3 is a diagrammatic perspective view of an electro-absorption-type implementation of the optical waveguide structure of FIG. 2.

FIG. 3 diagrammatically shows a perspective view of a ridge electro-absorption-type optical waveguide structure 22 that includes side ground electrodes 24, 26. In this implementation, the optical waveguide 14 is an optically transparent intrinsic semiconductor region that is sandwiched between a p-type cladding semiconductor region 30 and an n-type cladding semiconductor region 32. In operation, the p-i-n junction formed by regions 30, 14, 32 is reverse biased to modulate the optical signal intensity by optical absorption.

FIGS. 4A and 4B diagrammatically show side and top views of an electro-optic-type optical waveguide structure 34 that includes side ground electrodes 36, 38 and a bottom electrode 39. The illustrated embodiment corresponds to a Mach-Zehnder type of electro-optic optical modulator. In this implementation, the optical waveguide 14 is formed in a substrate 40 that is formed of an electro-optic material (e.g., lithium niobate). The optical waveguide 14 splits into two optical paths that pass underneath a respective one of the signal electrode path 16 and ground electrode 38. When an electric field is applied across the electrodes 36, 38, the electric fields are oppositely directed in each optical path. The oppositely directed electric fields produce a phase mismatch (or propagation constant mismatch) between the light portions in each optical path by increasing the refractive index in one optical path and decreasing the refractive index in the other optical path. The phase mismatch may be tailored to attenuate the amplitude of the optical signal created at the optical signal output where the optical signal portions in the two optical paths combine by phase cancellation.

Referring back to FIG. 1, after the optical waveguide structure 10 has been formed (step 12), in some implementations, the optical waveguide structure 10 optionally is stored for a period (step 41). In some embodiments, an array of optical waveguide structures is formed on a common substrate (e.g., a semiconductor wafer substrate) that is stored. The optical waveguide structure 10 may be stored, for example, in a clean environment (e.g., a "clean box") that prevents the optical waveguide structure 10 from being contaminated by particles and airborne molecular contamination. The optical waveguide structure 10 may be stored until, for example, the target transmission line characteristics for the final customized traveling wave optical modulator are determined (e.g., when a customer places a new order).

Depending on the implementation, after the optical waveguide structure 10 formed (step 12) or after it has been stored (step 41), the signal electrode path 16 is modified to include a customized signal electrode having a transmission line characteristic substantially matching a respective target transmission line parameter value (step 42). In some embodiments, the signal electrode path 16 is modified to include a signal electrode with a width determined by the underlying optical waveguide and a thickness that is selected to substantially match the characteristic impedance of the signal electrode to a target source impedance or to substantially match the electrical phase velocity of the signal electrode to the optical phase velocity of the optical waveguide, or to substantially match both of these characteristics. This allows the optical waveguide structure 10 to be fabricated with a design that is optimized for optical propagation and subsequently modified to form a customized traveling wave optical modulator with one or more transmission line characteristics that may be optimized over a range of different target transmission line parameter values.

FIG. 5A diagrammatically shows an implementation of the traveling wave optical waveguide structure 10 in which the signal electrode path 16 is defined by an electrode seed structure 44. The electrode seed structure 44 is a structure on which an electrically conductive material may be formed. For example, the electrode seed structure 44 may be one or more thin films of metal (e.g., gold, copper, or aluminum) that are formed on a substrate. In one implementation, the electrode seed structure 44 is a gold film with a thickness of 0.5 µm or less. In some embodiments, the electrode seed structure 44 is formed on another layer, such as a titanium layer, that improves the adhesion of electrode seed structure 44 to the underlying substrate.

The electrode seed structure 44 is not optimized for propagating an input electrical modulation signal. The un-optimized nature of the electrode seed structure 44 is evidenced when at least one of the following electrical parameter tests is satisfied:

$$\alpha \geq 1/L \quad (1)$$

$$Z_0 > 50 \text{ ohms} \quad (2)$$

$$N_E/N_O < 0.5 \text{ or } N_E/N_O > 2.0 \quad (3)$$

The parameter L is the length of electrode seed structure 44 and the parameter α is the attenuation factor, which is the real part of the propagation constant γ, which is inversely proportional to the electrical phase velocity and is given by:

$$\gamma = \alpha + j\beta = \sqrt{(R+Ls)(G+Cs)} \quad (4)$$

β is the imaginary part of the propagation constant, R is the series resistance, L is the series inductance, G is the shunt conductance, and C is the shunt capacitance of the transmission line formed by the electrode seed structure 44, the side ground electrodes 24, 26 (if present), and the bottom electrode 28. The parameter s is the complex frequency and is expressed as:

$$s = j \cdot 2\pi f$$

where j is imaginary and f is the electrical signal frequency. The parameter $Z_0$ is the characteristic impedance of the electrode seed structure transmission line and is expressed as:

$$Z_0 = \sqrt{\frac{(R + Ls)}{(G + Cs)}} \quad (5)$$

The parameters $N_E$ and $N_O$ are, respectively, the electrical and optical propagation indices, where $N_E$ is the ratio of the speed of light to the speed of electrical propagation through the seed layer 44 and $N_O$ is the ratio of the speed of light to the speed of optical propagation through the optical waveguide 14.

The electrical parameter test of equation (1) sets a threshold for the electrical loss through the electrode seed structure 44. For example, in some implementations, the electrode seed structure 44 is sufficiently thin that the electrical loss causes the attenuation factor α to be greater than 1/L, in which case the amplitude of the input electrical signal decreases to less than 1/e (36.8%) of its initial input value after traveling through the electrode seed structure 44.

The electrical parameter test of equation (2) sets a threshold for impedance mismatches between the electrode seed structure 44 and the input electrical source. For example, in some implementations, the electrode seed structure 44 is sufficiently thin that the characteristic impedance $Z_0$ is greater than 50 ohms, in which case, the electrode seed structure 44 is not impedance-matched to typical RF (Radio Frequency) signal sources, which have impedance values of 50 ohms or less.

The electrical parameter test of equation (3) sets a threshold for phase velocity mismatches between the input electrical signal and the optical signal. For example, in some implementations, the electrode seed structure is sufficiently thin that the ratio of the electrical propagation index $N_E$ to the optical propagation index $N_O$ is less than 50% (i.e., $N_E/N_O<0.5$ or $N_E/N_O>2.0$), in which case the electrical and optical propagation velocities are not sufficiently matched to enable effective optical modulation for practical high-speed optical modulation applications.

Referring to FIG. 5B, the final customized traveling wave optical modulator may be completed by forming an electrode layer 46 on electrode seed structure 44. In some implementations, the thickness of electrode layer 46 is selected to substantially match one or both of the characteristic impedance of the signal electrode to a target source impedance and the electrical phase velocity to the optical phase velocity. The electrode layer 46 may be formed by any suitable electrode formation techniques, including any metal film electroplating technique and any metal film deposition (e.g., evaporation) technique. Increasing the overall thickness of signal electrode lowers the series resistance proportional to the cross-sectional area of the signal electrode (neglecting skin effects), lowers the series inductance of the signal electrode, and increases the capacitance of the signal electrode by increasing the effective surface area between the signal electrode and the side ground conductors (if present). Changing these electrical parameter values in these ways lowers the characteristic impedance, increases the electrical phase velocity, and decreases electrical propagation loss.

FIG. 6A diagrammatically shows an implementation of the traveling wave optical waveguide structure 10 in which the signal electrode path 16 is defined by a signal electrode structure 48 that may be subsequently modified to form a customized signal electrode 50 having one or both of an electrical phase velocity substantially matched to the optical phase velocity through the waveguide structure 14 and a characteristic impedance substantially matched to the electrical signal source impedance. For example, the electrode structure 48 may have an initial thickness that substantially matches the characteristic impedance of the signal electrode structure 48 to a relatively low impedance source (e.g., a 20-ohm source). Referring to FIG. 5B, after the optical waveguide structure has been stored, the electrode 48 may be modified to substantially match the characteristic impedance of the customized signal electrode 50 to a relatively high impedance source (e.g., a 50-ohm source) by reducing the thickness of the electrode structure 48 (e.g., by etching).

Other embodiments are within the scope of the claims.

For example, the particular structures of the electro-absorption-type optical waveguide structure 22 and the electro-optic-type optical waveguide structure 34 are merely exemplary implementations. Other embodiments may be implemented in different ways. For example, some embodiments may incorporate any number of additional material layers or structures (e.g., one or more layers of materials interposed between one or more pairs of layers shown in the embodiments described above).

What is claimed is:

1. A method of fabricating a traveling wave optical modulator, comprising:
   before a target transmission line parameter value for a customized signal electrode has been determined, forming an optical waveguide structure having an optical waveguide and a signal electrode path extending from a signal input to a termination output;
   storing the formed optical waveguide structure;
   while the optical waveguide structure is being stored, determining the target transmission line parameter value; and
   after the target transmission line parameter value has been determined, modifying the signal electrode path to include the customized signal electrode having a transmission line characteristic substantially matching the target transmission line parameter value.

2. The method of claim 1, wherein the target transmission line parameter value is determined from a customer order for the traveling wave optical modulator.

3. The method of claim 1, wherein, before the signal electrode path is modified, the signal electrode path is defined by an electrode seed structure exposed for subsequent electrode formation.

4. The method of claim 3, wherein the electrode seed structure comprises a metal film.

5. The method of claim 4, wherein the metal film has a thickness less than 0.5 μm.

6. The method of claim 3, wherein the signal electrode path is modified by forming a signal electrode on the electrode seed structure.

7. The method of claim 6, wherein the signal electrode is formed by electroplating a metal film on the electrode seed structure.

8. The method of claim 6, wherein the signal electrode is formed by depositing a metal film on the electrode seed structure.

9. The method of claim 1, wherein, before the signal electrode path is modified, the signal electrode path is defined by an uncustomized signal electrode structure.

10. A method of fabricating a traveling wave optical modulator, comprising:
  forming an optical waveguide structure having an optical waveguide and a signal electrode structure extending from a signal input to a termination output in a plane and having a first thickness normal to the plane; and
  thinning the signal electrode structure to a second thickness that is normal to the plane and is smaller than the first thickness, wherein the thinned signal electrode structure has a transmission line characteristic substantially matching a target transmission line parameter value.

11. The method of claim 10, wherein the signal electrode structure is thinned by etching.

12. The method of claim 1, wherein modifying the signal electrode path comprises substantially matching the transmission line characteristic of the customized signal electrode to a target characteristic impedance value.

13. The method of claim 12, wherein the transmission line characteristic of the customized signal electrode is substantially matched to an impedance value between approximately 20 ohms and approximately 50 ohms.

14. The method of claim 1, wherein the optical waveguide structure is an electro-absorption-type optical waveguide structure.

15. The method of claim 1, wherein the optical waveguide structure is an electro-optic-type optical waveguide structure.

16. The method of claim 3, wherein the electrode seed structure has a transmission line characteristic detrimental to proper propagation of an electrical modulation signal.

17. The method of claim 3, wherein the electrode seed structure is characterized by an attenuation factor a, the electrode seed structure has a characteristic length L, and $\alpha \geq 1/L$.

18. The method of claim 3, wherein the electrode seed structure is characterized by a characteristic impedance greater than 50 ohms.

19. The method of claim 3, wherein the electrode seed structure is characterized by an electrical propagation parameter $N_E$, the optical waveguide is characterized by an optical propagation parameter $N_O$, and $N_E/N_O < 0.5$.

20. The method of claim 3, wherein the electrode seed structure is characterized by an electrical propagation parameter $N_E$, the optical waveguide is characterized by an optical propagation parameter $N_O$, and $N_{E/NO} < 2.0$.

* * * * *